US010247328B2

(12) United States Patent
Jaeker et al.

(10) Patent No.: US 10,247,328 B2
(45) Date of Patent: Apr. 2, 2019

(54) GUIDE SYSTEM FOR SUPPLY LINES AND ROBOT HAVING A GUIDE SYSTEM

(71) Applicant: igus GmbH, Cologne (DE)

(72) Inventors: Thilo-Alexander Jaeker, Sankt Augustin (DE); Ralf Steeger, Lohmar (DE)

(73) Assignee: IGUS GMBH, Cologne (DE)

( * ) Notice: Subject to any disclaimer, the term of this patent is extended or adjusted under 35 U.S.C. 154(b) by 14 days.

(21) Appl. No.: 15/301,612

(22) PCT Filed: Mar. 25, 2015

(86) PCT No.: PCT/EP2015/056468
§ 371 (c)(1),
(2) Date: Oct. 3, 2016

(87) PCT Pub. No.: WO2015/150197
PCT Pub. Date: Oct. 8, 2015

(65) Prior Publication Data
US 2017/0023154 A1 Jan. 26, 2017

(30) Foreign Application Priority Data
Apr. 3, 2014 (DE) .................. 20 2014 101 590 U

(51) Int. Cl.
*F16L 3/015* (2006.01)
*B25J 19/00* (2006.01)
(Continued)

(52) U.S. Cl.
CPC ........... *F16L 3/015* (2013.01); *B25J 19/0025* (2013.01); *B25J 19/0029* (2013.01);
(Continued)

(58) Field of Classification Search
CPC .... B25J 19/0025; B25J 19/0029; B25J 19/00; H02G 3/0468; H02G 11/00; H02G 11/003;
(Continued)

(56) References Cited

U.S. PATENT DOCUMENTS 3,894,616 A * 7/1975 Kawanishi ................ B66F 9/08
187/228
5,829,307 A 11/1998 Harima et al.
(Continued)

FOREIGN PATENT DOCUMENTS

DE 19645413 10/1997
DE 10141366 10/2002
(Continued)

OTHER PUBLICATIONS

PCT International Search Report dated Jun. 25, 2015, received in corresponding PCT Application No. PCT/EP2015/056468.
(Continued)

*Primary Examiner* — Christopher Garft
(74) *Attorney, Agent, or Firm* — Grossman, Tucker, Perreault & Pfleger, PLLC

(57) ABSTRACT

The invention relates to a guide system for supply lines for a handling device, particularly for a robot, having a guide base, a deflecting element guided along a linear travel path by the guide base, and a chain-like, hose-like or belt-like strand, where the deflecting element can travel along the travel path, from a retracted position into an extended position, by means of a tensile force acting on the strand and against a restoring force, the restoring force being generated by a restoring device located on or in the guide base. The restoring device displays at least one elastic cord or elastic belt that is guided around a deflecting device located on or in the guide base, adjacent to the retracted position of the
(Continued)

Figure 1:
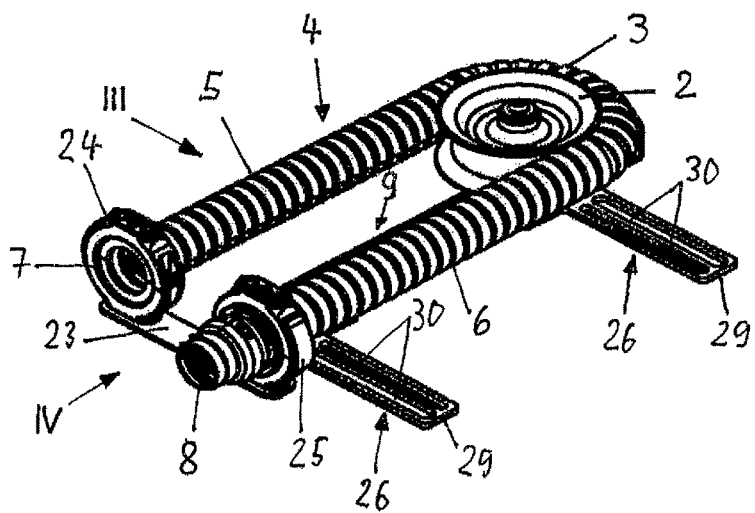

deflecting element, and, adjoining it, a first section that is connected to the deflecting element, and a second section that is connected to the guide base. The invention furthermore relates to a handling device, particularly robot, having a guide system of this kind.

23 Claims, 3 Drawing Sheets

(51) Int. Cl.
 *H02G 3/04* (2006.01)
 *H02G 11/00* (2006.01)
(52) U.S. Cl.
 CPC ........... *H02G 3/0468* (2013.01); *H02G 11/00* (2013.01); *Y10S 901/28* (2013.01)
(58) Field of Classification Search
 CPC .. H02G 11/006; F16L 3/015; Y10T 74/20311; Y10S 901/28; A14D 34/822
 USPC .................. 248/51–52; 74/490.02, 501.5 R; 414/918; 174/69
 See application file for complete search history.

(56) References Cited

U.S. PATENT DOCUMENTS

| | | | | |
|---|---|---|---|---|
| 8,117,939 | B2* | 2/2012 | Burlot | ............. B25J 19/0025 74/490.02 |
| 9,399,299 | B2 | 7/2016 | Hermey et al. | |
| 2014/0033851 | A1* | 2/2014 | Hermey | ............. B25J 19/0025 74/490.02 |
| 2015/0328780 | A1* | 11/2015 | Burlot | ............. B25J 19/0025 74/490.02 |

FOREIGN PATENT DOCUMENTS

| | | |
|---|---|---|
| DE | 102009037515 | 3/2011 |
| DE | 202011004786 | 9/2011 |
| DE | 102011018440 | 12/2011 |
| EP | 0669690 | 8/1995 |
| FR | 2781315 | 1/2000 |
| JP | 3-103193 | 10/1991 |
| JP | 2008-528305 | 7/2008 |
| JP | 2012-161903 | 8/2012 |
| WO | 2011/025081 | 3/2011 |

OTHER PUBLICATIONS

PCT English language International Preliminary Report on Patentability and Written Opinion dated Oct. 4, 2016, received in corresponding PCT Application No. PCT/EP2015/056468.

Office Action dated Aug. 14, 2018, received in related Japanese Application No. 2016-557009. English translation of relevant portions of the Office Action is attached.

* cited by examiner

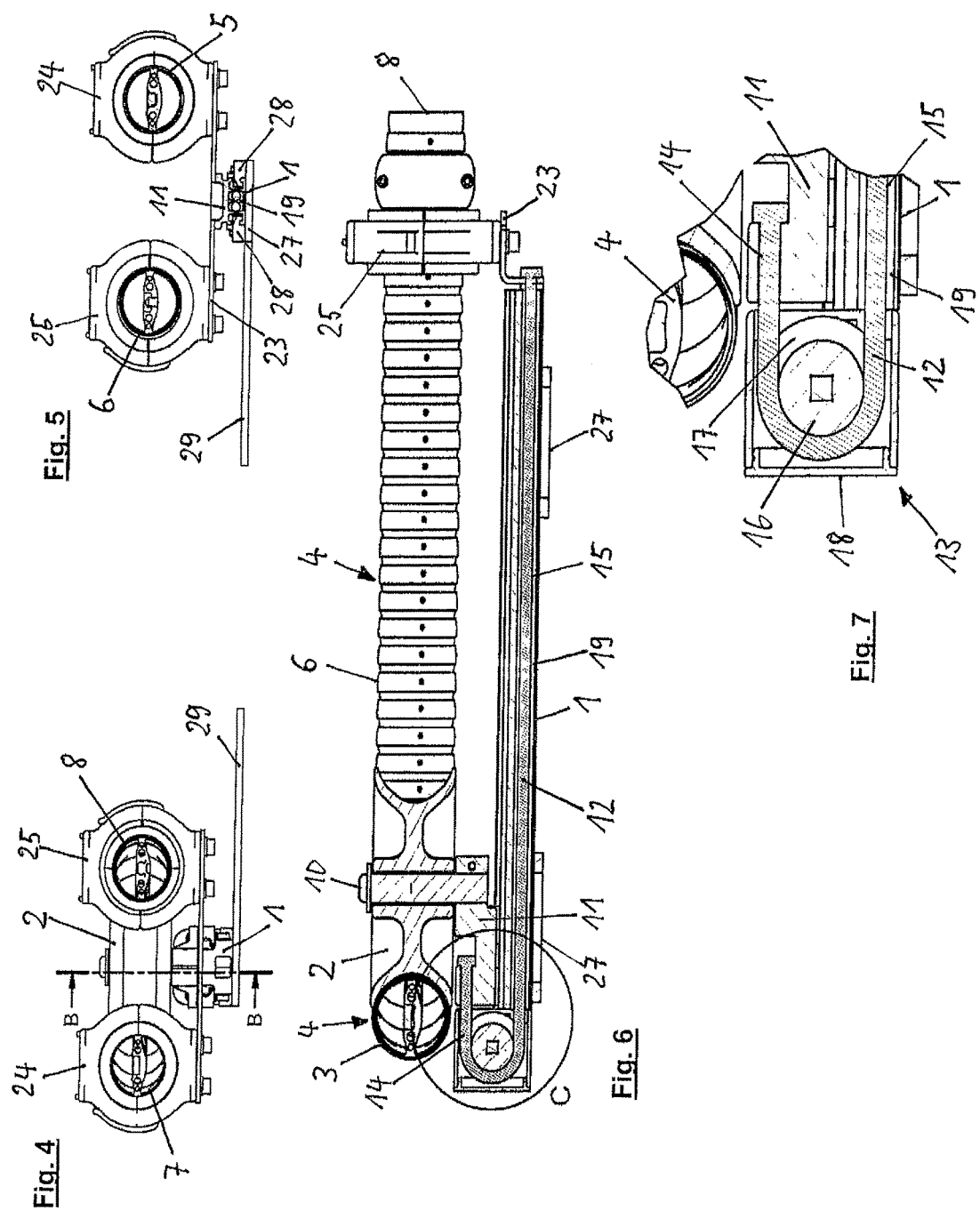

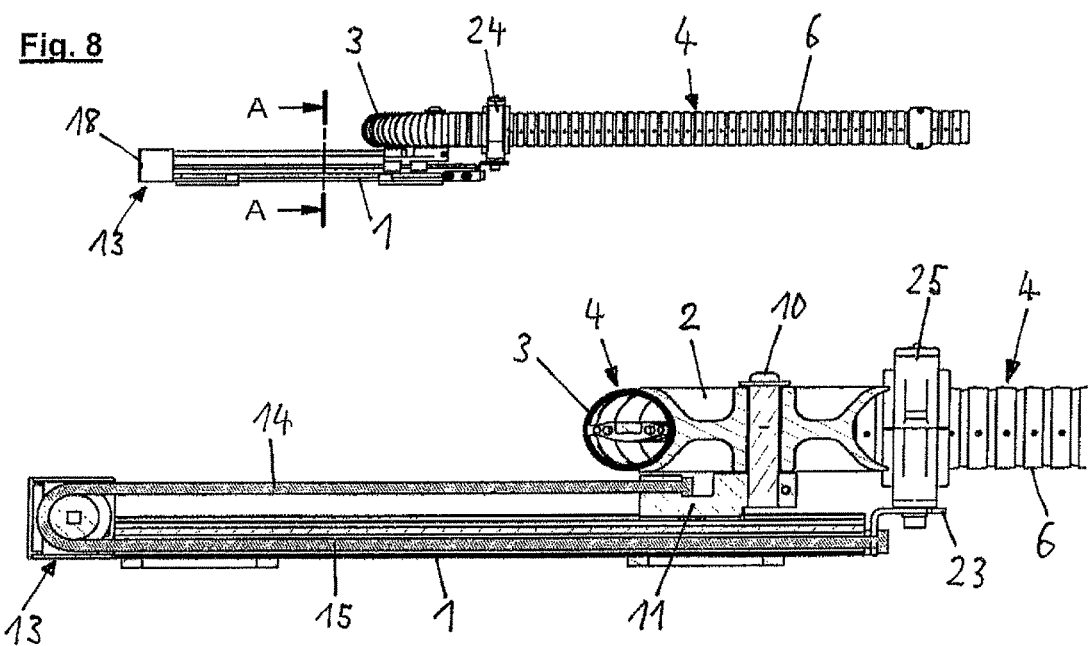
Fig. 8
Fig. 10
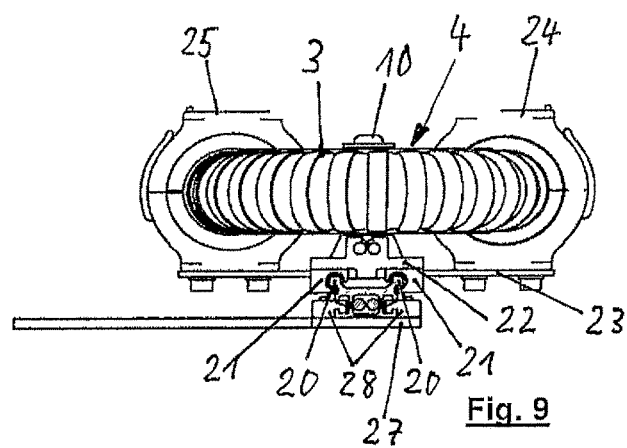
Fig. 9

GUIDE SYSTEM FOR SUPPLY LINES AND ROBOT HAVING A GUIDE SYSTEM

The invention relates to a guide system for supply lines for a handling device, particularly for a robot, having a guide base, a deflecting element guided along a linear travel path by the guide base, and a chain-like, hose-like or belt-like strand, in or on which the supply lines can be arranged, where the strand, forming a reversing bend, is guided around the deflecting element and displays two branches adjoining the ends of the reversing bend, each having a connecting point located on its free end, specifically a first connecting point that is stationary relative to the guide base and a second connecting point that moves relative to the guide base, and where the deflecting element can travel from a retracted position into an extended position, by means of a tensile force acting on the branch having the second connecting point and against a restoring force, where the restoring force can be generated by a restoring device located on or in the guide base.

The invention furthermore relates to a handling device, particularly a robot, having a guide system of this kind, where the guide base is located on a first part of the handling device, and the branch of the chain-like, hose-like or belt-like strand having the first connecting point is connected to this part, and the branch having the second connecting point is connected to a second part of the handling device that moves relative to the first part.

A guide system of this kind, and a handling device having a guide system of this kind, is known from DE 20 2011 004 786 U1. Provided as the restoring device for the deflecting element, designed as a deflection roller, in this system is a pneumatic pressure cylinder, the plunger of which acts on an anchor, in which the axle of the deflection roller is mounted and which engages a guide rail in sliding fashion.

The pneumatic pressure cylinder generating the restoring force for the deflection roller, and the necessary energy supply of the pressure cylinder require a correspondingly dimensioned space on or in the handling device and are relatively complex.

The object of the present invention is to provide a guide system having a restoring device that requires less space on or in the handling device, is less complex and lighter, and is thus also suitable for smaller handling devices, particularly robots.

According to the invention, the object is solved in that, on a guide system of the kind indicated in the opening paragraph, the restoring device displays at least one elastic cord or elastic belt that is guided around a deflecting device located on or in the guide base, adjacent to the retracted position of the deflecting element, and, adjoining it, a first section that is connected to the deflecting element, and a second section that is connected to the guide base.

The restoring device displaying at least one elastic cord or elastic belt requires a relatively small installation space, meaning that the guide system according to the invention can be attached in areas of a handling device for which the known system would not be suitable. It can therefore particularly be used on smaller robots, also due to its relatively low weight. Moreover, the restoring device is relatively simple to realize technically, and thus less expensive.

Open to consideration as the elastic cord or elastic belt are cords or belts made of natural or synthetic rubber that display an extensibility satisfying the requirements of the present invention over the travel path of the deflecting element from its retracted position to its extended position relative to the guide base.

The cord or belt made of natural or synthetic rubber preferably displays a sheath that improves its abrasion resistance and/or sliding properties. The sheath thus has a protective and/or sliding function for the elastic cord or belt, which is guided around the deflecting element during travel of the latter and is exposed to friction in the process. In the simplest case, the sheath can be a thin layer of plastic, e.g. of Teflon®, that is sprayed onto the cord or belt. Preferably provided as the sheath is braiding made of synthetic fibers that improve the wear resistance and/or sliding properties of the cord or belt, such as fibers made of polyethylene, Kevlar®, polyamides or aramids. The braiding made of fibers of this kind is preferably designed in such a way that it can extend and contract again in the longitudinal direction of the cord or belt.

Owing to the deflection of the at least one elastic cord or elastic belt by a deflecting device located on or in the guide base, the length of the cord or belt to be extended from the retracted position of the deflecting element to the extended position during travel is greater than the travel path. As the elongation of the elastic cord or belt thus extends over a greater length than that of the travel path, a relatively constant elastic force of the cord or belt over the travel path of the deflecting element is obtained.

The second section of the at least one elastic cord or belt, which is connected to the guide base, preferably extends over at least the length of the travel path of the deflecting element between its retracted position and its extended position.

Furthermore, the at least one elastic cord or belt is located in the restoring device, and connected to the deflecting elements and the guide base, in such a way that it displays a predetermined tensile force in the retracted position of the deflecting element.

For safety reasons, the restoring device can particularly display two elastic cords or elastic belts.

According to a preferred development of the invention, the guide base displays a guide rail, where the deflecting element is located on a slide that is guided by the guide rail along the travel path of the deflecting element, and the end of the first section of the at least one elastic cord or belt is fastened to the slide.

The deflecting device for the at least one elastic cord or belt is preferably located on the end of the guide rail opposite the extended position of the deflecting element.

When arranged in this way, the deflecting device can limit the travel path of the deflecting element into the retracted position.

The deflecting device is preferably located on the face end of the guide rail that faces in the direction of the travel path from the extended position of the deflecting element to the retracted position.

The deflecting device can display a housing, the side of which facing towards the deflecting element displays an opening for the two sections of the at least one elastic belt or cord.

The deflecting device can furthermore display a roller, against the circumference of which the elastic cord or belt lies and which is mounted in the housing.

In a preferred embodiment of the guide rail, the second section of the elastic cord or belt is located in a gutter or a laterally closed channel of the guide rail. The gutter or channel serves to protect and guide the section of the elastic cord or belt extending between the deflecting device and the fastening point on the guide rail.

The first section of the elastic cord or belt, connected to the deflecting element for the strand, can also be located within the guide rail, where its end area is connected to an area of the slide extending through a slit into the interior of the guide rail.

To protect the elastic cord or belt, and to avoid the ingress of foreign particles into the slit, the slit can be closed off from the outside by a roll-up belt moving with the slide, or by bellows or the like.

In a preferred embodiment, a profiled rail is used as the guide rail. The profile rail preferably consists of metal, particularly aluminum, and can easily be adapted to the required length of the travel path of the deflecting element by cutting to length. It can alternatively also consist of a suitable plastic material that particularly possesses good sliding properties.

In a preferred embodiment, the profiled rail displays two, laterally projecting sliding rails, where the slide displays two housing parts in its lateral areas for accommodating the sliding rails, and a plate-like mounting part, connected to the two housing parts, for fastening the deflecting element. The housing parts can be designed as housing bearings having plain bearings located within them, for example.

The deflecting element is preferably designed as a deflection roller, on whose circumference the reversing bend of the strand containing the supply lines rests and whose axle is mounted on the slide in rotating fashion.

The axle of the deflection roller is preferably perpendicular to the axle of the deflecting device, designed as a roller, for the elastic cord or belt.

The end of the second section of the at least one elastic cord or belt can be fastened to the end of the guide rail that faces in the direction of the travel path from the retracted position of the deflecting element to the extended position.

Located at the end of the guide rail facing in the direction of the travel path from the retracted position of the deflecting element to the extended position, can be a web, extending transversely to the guide rail and projecting on both sides of it, the one end area of which displays a retaining device for the stationary mounting of the branch of the strand containing the supply lines with the first connecting point, and the other end area of which displays a guide for the branch of the strand with the second connecting point. A retaining ring that fixes the strand in place at the point in question can be used as the retaining device. The guide for the branch of the strand with the second connecting point can be designed as a ring-shaped sliding leadthrough, with self-aligning bearings if appropriate.

On its long side opposite the slide, the guide rail can display retaining means, arranged in adjustable and lockable fashion in the longitudinal direction of the guide rail. Provided for this purpose can be clamps that are located on a plate of the retaining means and engage lateral grooves of the guide rail.

The subject matter of the invention is furthermore a handling device, particularly a robot, having a guide system displaying the features described above, either singly or in any desired combination, where the guide base is located on a first part of the handling device, and the branch of the chain-like, hose-like or belt-like strand having the first connecting point is connected to this part, and the branch having the second connecting point is connected to a second part of the handling device that moves relative to the first part.

The strand in which the supply lines can be arranged is preferably designed as a closed, tubular energy guiding chain, the links of which are connected to each other in pivoting fashion by joint elements located on the inside of the chain. The articulated connection of the links of a chain of this kind permits three-dimensional movements of the chain.

Figure 2:
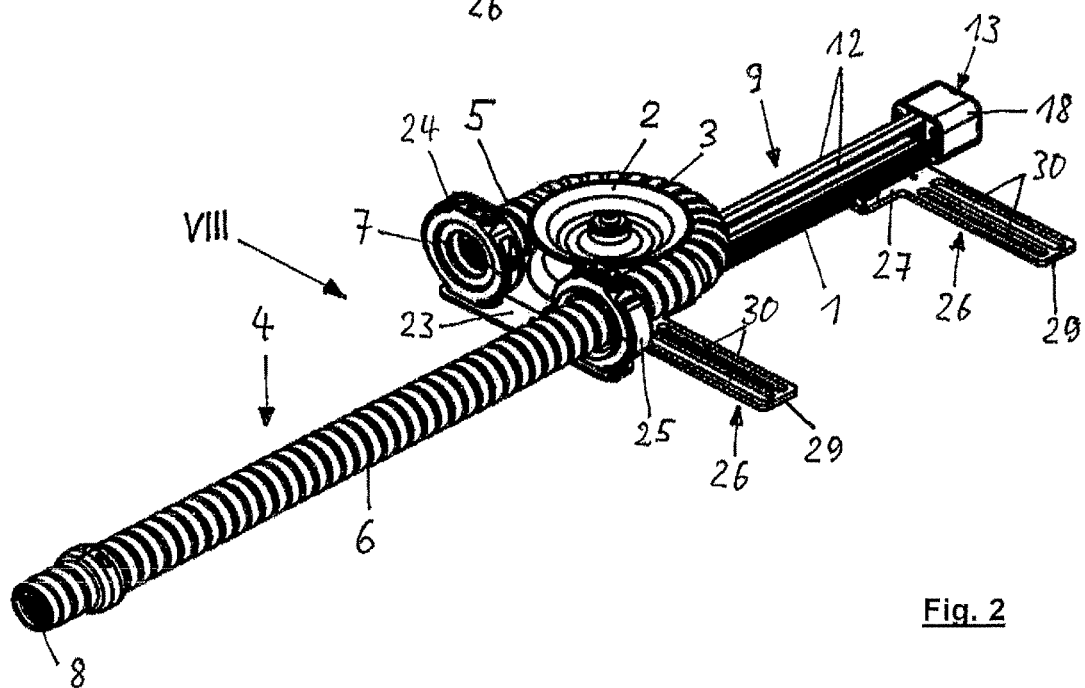
Figure 3:
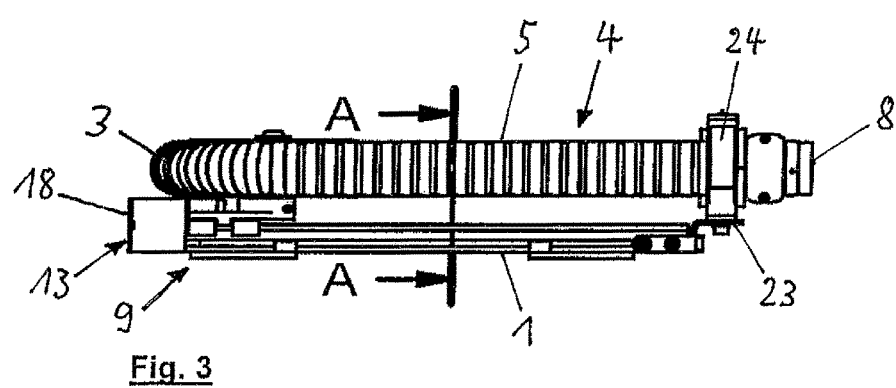

One embodiment of the present invention is described in more detail below on the basis of the drawing. The Figures show the following:

FIG. 1 A perspective view of a guide system according to the invention, in retracted state, FIG. 2 A perspective view of the guide system illustrated in FIG. 1, in extended state, FIG. 3 A side view of the guide system according to FIG. 1, in the direction of arrow III, FIG. 4 A front view of the guide system according to FIG. 1, in the direction of arrow IV, FIG. 5 A sectional view along line A-A in FIG. 3, FIG. 6 A sectional view along line B-B in FIG. 4, FIG. 7 An enlarged view of area C in FIG. 6, FIG. 8 A side view of the guide system in extended state according to FIG. 2, in the direction of arrow VIII, FIG. 9 A sectional view along line A-A in FIG. 8, FIG. 10 A longitudinal section through the guide system illustrated in FIG. 8, in extended state analogous to FIG. 6.

FIGS. 1 and 2 illustrate an embodiment of a guide system for supply lines (not shown in the drawing) for a handling device (not shown in the drawing), particularly for a robot, that displays a guide base 1, by which a deflecting element 2, designed as a deflection roller, can be guided along a linear travel path between a retracted position (FIG. 1) and an extended position (FIG. 2). Guided around deflecting element 2 is the reversing bend 3 of a chain-like strand 4, which displays two branches 5 and 6, adjoining reversing bend 3. The free end of branch 5 displays a first connecting point 7, which is stationary relative to guide base 1, branch 6 displaying a second connecting point 8, which moves relative to guide base 1.

If deflecting element 2 is in its retracted position (FIG. 1) and a tensile force in the direction of arrow Z is exerted on branch 6 with second connecting point 8, deflecting element 2, guided by guide base 1, is moved into the extended position (FIG. 2), against a restoring force. The restoring force is generated by a restoring device 9, located on guide base 1.

As can be seen in more detail from FIGS. 5 and 6, or 9 and 10, guide base 1 is designed as a profiled rail. It consists of hard anodized aluminum and is adapted to the required length of the travel path of deflecting element 2 by cutting to length from an extruded section. Axle 10 of deflecting element 2, designed as a deflection roller, is mounted in rotating fashion in a slide 11, guided on the profiled rail.

As particularly shown in the longitudinal sections in FIGS. 6 and 10, restoring device 9 displays at least one elastic cord 12, which is guided around a deflecting device 13, located on guide base 1 adjacent to the retracted position (FIG. 6) of the deflecting element and, adjoining it, displays a first section 14, which is connected to the slide of deflecting element 2 located on it, and a second section 15, which is connected to guide base 1. The fixing of the free end of first section 14 of elastic cord 12 on slide 11 is illustrated only schematically in FIGS. 6 and 10, as is the fixing of the free end of second section 15 on guide base 1. As can be seen from FIGS. 1 and 2, as well as the cross-sectional views in FIGS. 5 and 9, two elastic cords 12 are provided, whose first sections 14 are connected to slide 11, their second sections 15 being connected to guide base 1.

As shown in FIGS. 6, 7 and 10, deflecting device 13 displays a roller 16 for each of the two elastic cords, against the circumference of which the respective elastic cord lies.

When deflecting element 2 travels from its retracted position to its extended position, the two cords 12 are guided around roller 16, such that elastic cords 12 are extended over their entire length, particularly also over their second sections 15. Consequently, the result is a restoring force that is largely constant over the travel path of deflecting element 2.

As can particularly be seen from the enlarged view in FIG. 7, the two rollers 16 for the two elastic cords 12 are separated from each other by an intermediate disc 17. The two rollers 16 can be located on non-rotating fashion on a common axle that is mounted in intermediate disc 17 in rotating fashion.

It can furthermore be seen from FIG. 7 that rollers 16 and intermediate disc 17 are located in a housing 18. The face end of housing 18 pointing towards slide 11 is open to allow passage of the two sections 14 and 15 of the elastic cords 12. Housing 18 can furthermore serve as a stop to limit the travel path of slide 11 in the profiled rail, from the extended position of deflecting element 2 to its retracted position.

The two elastic cords 12 are arranged, and their length is dimensioned, in such a way that a tensile stress acts on slide 11, and thus on deflecting element 2, when deflecting element 2 is in its retracted position, in which slide 11 can lie against housing 18 of deflecting device 13.

As can be seen from FIGS. 6 and 10, as well as from the cross-sectional views in FIGS. 5 and 9, the second sections 15 of the two elastic cords 12 are located in a laterally closed channel 19 that extends over the entire length of the profiled rail. In contrast, the two first sections 14 of the two elastic cords 12 run freely over guide base 1 between housing 18 and slide 11.

As can be seen from the cross-sectional views in FIGS. 5 and 9, the profiled rail displays two laterally projecting sliding rails 20. The lateral area of slide 11 displays two housing parts 21 for accommodating sliding rails 20, and a plate-like mounting part 22, connected to the two housing parts 21, on which the ends of the two first sections 14 of elastic cords 12 are fastened and the axle 10 of the deflection roller for chain-like strand 4 is mounted. Housing parts 21 are designed as housing bearings with plain bearings located therein.

The free ends of the second sections 15 of the two elastic cords 12 are fixed in the area of the ends of the profiled rail that faces in the direction of the travel path from the retracted position of deflecting element 2 to its extended position. Located at this end is a web 23 that extends transversely to the profiled rail and projects on both its sides. Web 23 is fastened at the end of the profiled rail via a bracket 24 that is angled in its middle area. In its one area projecting transversely to the profiled rail, a retaining ring 24 is fitted on web 23 for fixing chain-like strand 4 at the point in question. Provided on web 23 in the other area, projecting on the opposite side of the profiled rail, is a ring-shaped sliding leadthrough 25, through which branch 6 with second connecting point 8 of chain-like strand 4 is guided when strand 4 travels.

Branch 6 with second connecting point 8 displays, in an area lying on the side of sliding leadthrough 25 facing away from deflecting element 2, a collar 26, projecting radially over strand 4, whose outside diameter is greater than the inside diameter of sliding leadthrough 25. Collar 26 is fixed in branch 6 in such a way that, in the retracted position of deflecting element 2, it lies axially on sliding leadthrough 25 and thus limits the travel path of deflecting element 2 from the extended position to the retracted position.

On its longitudinal side opposite slide 11, the profiled rail displays retaining means 27, arranged in adjustable and lockable fashion in the longitudinal direction of the profiled rail. As can particularly be seen from FIG. 2, retaining means 27 are located on the two end areas of the profiled rail. They each display a plate-like part 28, extending below the profiled rail, on which clamps 29 are located on both sides of the profiled rail that engage lateral grooves extending over the length of the profiled rail. Adjoining plate-like parts 28 are webs 30, extending away from the profiled rail, which serve to fasten guide base 1 on a base, such as a part of a handling device. Webs 30 display slits 31, extending in their longitudinal direction, through which studs (not shown in the drawing) for fastening guide base 1 on the part of the handling device in question can reach, it being possible to adjust the position of guide base 1 relative to this part along slits 31.

Strand 4, illustrated in the Figures, in which the supply lines (not shown in the drawing) can be arranged, is a closed, tubular energy guiding chain, where adjacent links of this chain are connected to each other in pivoting fashion by joint elements located in the interior of the chain. The articulated connection of the links permits three-dimensional movement of the chain.

LIST OF REFERENCE NUMBERS

1 Guide base
2 Deflecting element
3 Reversing bend
4 Strand
5 Branch
6 Branch
7 First connecting point
8 Second connecting point
9 Restoring device
10 Axle
11 Slide
12 Elastic cord
13 Deflecting device
14 First section
15 Second section
16 Roller
17 Intermediate disc
18 Housing
19 Channel
20 Sliding rail
21 Housing part
22 Mounting part
23 Web
24 Retaining ring
25 Sliding leadthrough
26 Collar
27 Retaining means
28 Plate-like part
29 Clamp
30 Web
31 Slit

What is claimed is:

1. A guide system for supply lines for a handling device, comprising:
    a guide base,
    a deflecting element guided along a linear travel path by the guide base, and
    a chain-like, hose-like or belt-like strand, in or on which the supply lines are arrangeable,
    wherein the strand is guided around the deflecting element such that the strand forms a reversing bend and two branches adjoining the reversing bend, each branch having a free end and a connecting point located on the free end, wherein a first connecting point of the connecting points is stationary relative to the guide base and a second connecting point of the connecting points moves relative to the guide base, and wherein the deflecting element is movable from a retracted position into an extended position, by a tensile force acting on the branch having the second connecting point and against a restoring force, wherein the restoring force is provided by a restoring device located on or in the guide base, wherein the restoring device comprises at least one elastic cord or elastic belt that is guided around a deflecting device coupled to the guide base adjacent to the retracted position of the deflecting element, wherein the at least one elastic cord or elastic belt comprises a first section connected to the deflecting element, and a second section connected to the guide base, wherein the guide base comprises a guide rail and the deflecting element is located on a slide that is guided by the guide rail along the travel path, wherein the deflecting device further comprises a roller arranged such that the at least one elastic cord or elastic belt is guided around the roller, wherein the deflecting device is located at an end of the guide rail in a direction of the travel path, the deflecting device comprising a housing configured to provide a stop which limits travel of the slide along the travel path, wherein the guide rail has a longitudinal length in a longitudinal direction of the guide rail corresponding to a direction of the travel path, wherein the housing is arranged outside the longitudinal length of the guide rail at an end face of the guide rail, and wherein the housing has an opening facing the end face of the guide rail, through which the at least one elastic cord or elastic belt extends towards the guide rail in the longitudinal direction of the guide rail.

2. The guide system according to claim 1, wherein the second section of the at least one elastic cord or elastic belt is located in a gutter or a laterally closed channel of the guide rail.

3. The guide system according to claim 1, wherein the first section of the at least one elastic cord or elastic belt is located within the guide rail, and has an end area connected to an area of the slide extending through a slit into an interior of the guide rail.

4. The guide system according to claim 1, wherein the guide rail is configured as a profiled rail.

5. The guide system according to claim 4, wherein the profiled rail comprises two, laterally projecting sliding rails and the slide comprises lateral areas each having a housing part for accommodating a sliding rail, and a plate-like mounting part, connected to the two housing parts, to which the deflecting element is fastened.

6. The guide system according to claim 1, wherein the deflecting element is designed as a deflection roller, on whose circumference the reversing bend of the strand rests and whose axle is mounted on the slide in rotating fashion.

7. The guide system according to claim 6, wherein the axle of the deflection roller is perpendicular to an axle of the deflecting device for the at least one elastic cord or elastic belt.

8. The guide system according to claim 1, wherein the second section of the at least one elastic cord or elastic belt has an end which is fastened to the guide rail.

9. The guide system according to claim 1, wherein a web is located at an end of the guide rail facing in a direction of the travel path from the retracted position of the deflecting element to the extended position, the web extending transversely to the guide rail and having one end area which comprises a retaining device for stationary mounting of the branch with the first connecting point, and another end area which comprises a guide for the branch with the second connecting point.

10. The guide system according to claim 1, wherein the guide rail comprises retaining means on a side facing away from the slide, the retaining means arranged in adjustable and lockable fashion in a longitudinal direction of the guide rail.

11. The guide system according to claim 1, wherein the at least one elastic cord or elastic belt of the restoring device comprises at least two elastic cords or elastic belts.

12. A handling device having a guide system according to claim 1, where the guide base is located on a first part of the handling device, and the branch of the chain-like, hose-like or belt-like strand having the first connecting point is connected to the first part, and the branch having the second connecting point is connected to a second part of the handling device that moves relative to the first part.

13. A guide system for supply lines for a handling device, comprising:

a guide base, a deflecting element guided along a linear travel path by the guide base, and a chain-like, hose-like or belt-like strand, in or on which the supply lines are arrangeable, wherein the strand is guided around the deflecting element such that the strand forms a reversing bend and two branches adjoining the reversing bend, each branch having a free end and a connecting point located on the free end, wherein a first connecting point of the connecting points is stationary relative to the guide base and a second connecting point of the connecting points moves relative to the guide base, and wherein the deflecting element is movable from a retracted position into an extended position, by a tensile force acting on the branch having the second connecting point and against a restoring force, wherein the restoring force is provided by a restoring device located on or in the guide base, wherein the restoring device comprises at least one elastic cord or elastic belt that is guided around a deflecting device coupled to the guide base adjacent to the retracted position of the deflecting element, wherein the at least one elastic cord or elastic belt comprises a first section connected to the deflecting element, and a second section connected to the guide base, wherein the guide base comprises a guide rail and the deflecting element is located on a slide that is guided by the guide rail along the travel path, wherein the deflecting device further comprises a roller arranged such that the at least one elastic cord or elastic belt is guided around the roller, wherein the deflecting device is located at an end of the guide rail in a direction of the travel path, the deflecting device comprising a housing configured to provide a stop which limits travel of the slide along the travel path, wherein the first section of the at least one elastic cord or elastic belt has a first end which is fastened to the slide, wherein the second section of the at least one elastic cord or elastic belt has a second end which is fastened to the guide rail, and wherein the housing is limited to containing the roller without containing the first end or the second end of the at least one elastic cord or elastic belt.

14. The guide system according to claim 13, wherein the second section of the at least one elastic cord or elastic belt is located in a gutter or a laterally closed channel of the guide rail.

15. The guide system according to claim 13, wherein the first section of the at least one elastic cord or elastic belt is located within the guide rail, and has an end area connected to an area of the slide extending through a slit into an interior of the guide rail.

16. The guide system according to claim 13, wherein the guide rail is configured as a profiled rail.

17. The guide system according to claim 16, wherein the profiled rail comprises two, laterally projecting sliding rails and the slide comprises lateral areas each having a housing part for accommodating a sliding rail, and a plate-like mounting part, connected to the two housing parts, to which the deflecting element is fastened.

18. The guide system according to claim 13, wherein the deflecting element is designed as a deflection roller, on whose circumference the reversing bend of the strand rests and whose axle is mounted on the slide in rotating fashion.

19. The guide system according to claim 18, wherein the axle of the deflection roller is perpendicular to an axle of the deflecting device for the at least one elastic cord or elastic belt.

20. The guide system according to claim 13, wherein a web is located at an end of the guide rail facing in a direction of the travel path from the retracted position of the deflecting element to the extended position, the web extending transversely to the guide rail and having one end area which comprises a retaining device for stationary mounting of the branch with the first connecting point, and another end area which comprises a guide for the branch with the second connecting point.

21. The guide system according to claim 13, wherein the guide rail comprises retaining means on a side facing away from the slide, the retaining means arranged in adjustable and lockable fashion in a longitudinal direction of the guide rail.

22. The guide system according to claim 13, wherein the at least one elastic cord or elastic belt of the restoring device comprises at least two elastic cords or elastic belts.

23. A handling device having a guide system according to claim 13, where the guide base is located on a first part of the handling device, and the branch of the chain-like, hose-like or belt-like strand having the first connecting point is connected to the first part, and the branch having the second connecting point is connected to a second part of the handling device that moves relative to the first part.

\* \* \* \* \*